UNITED STATES PATENT OFFICE.

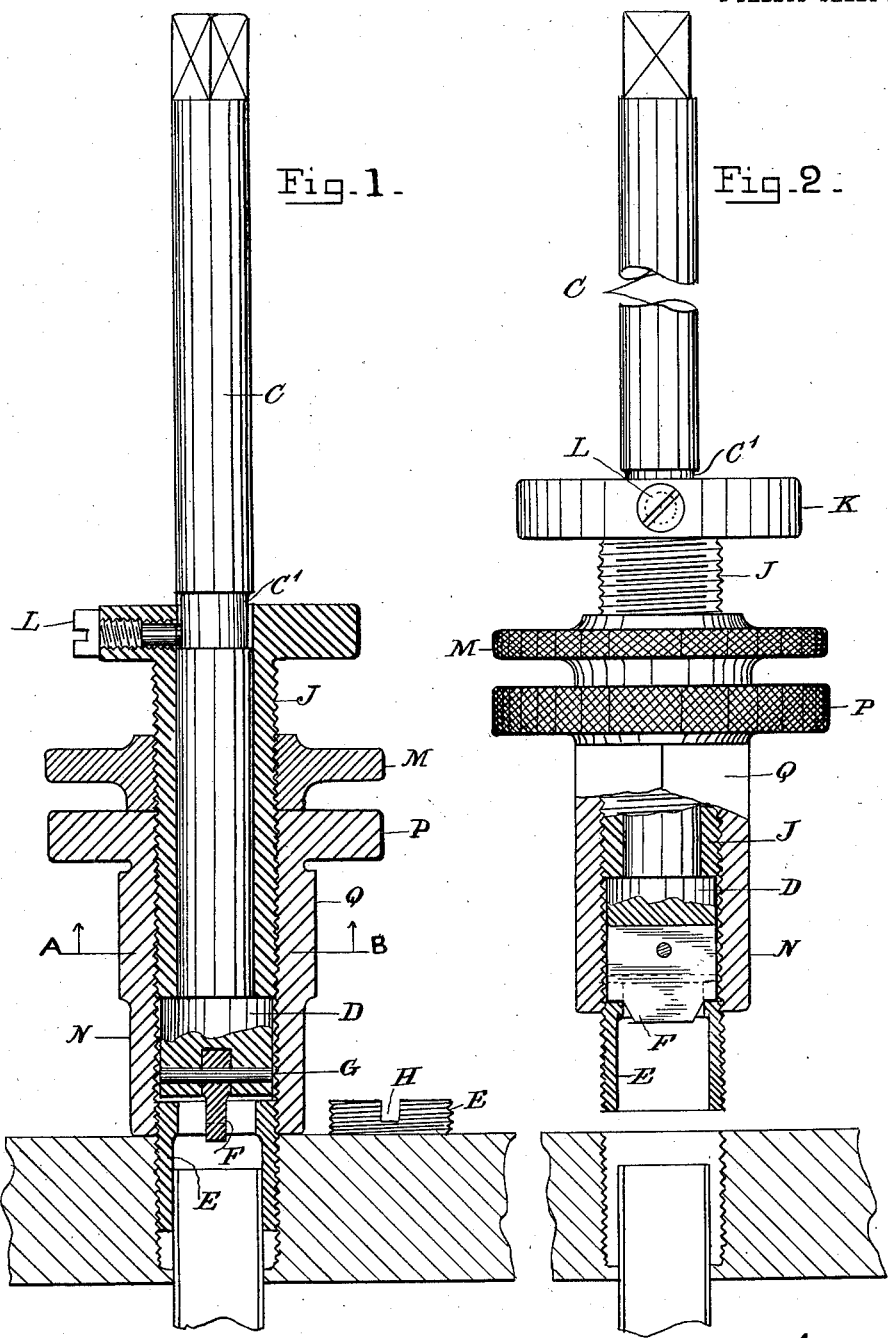

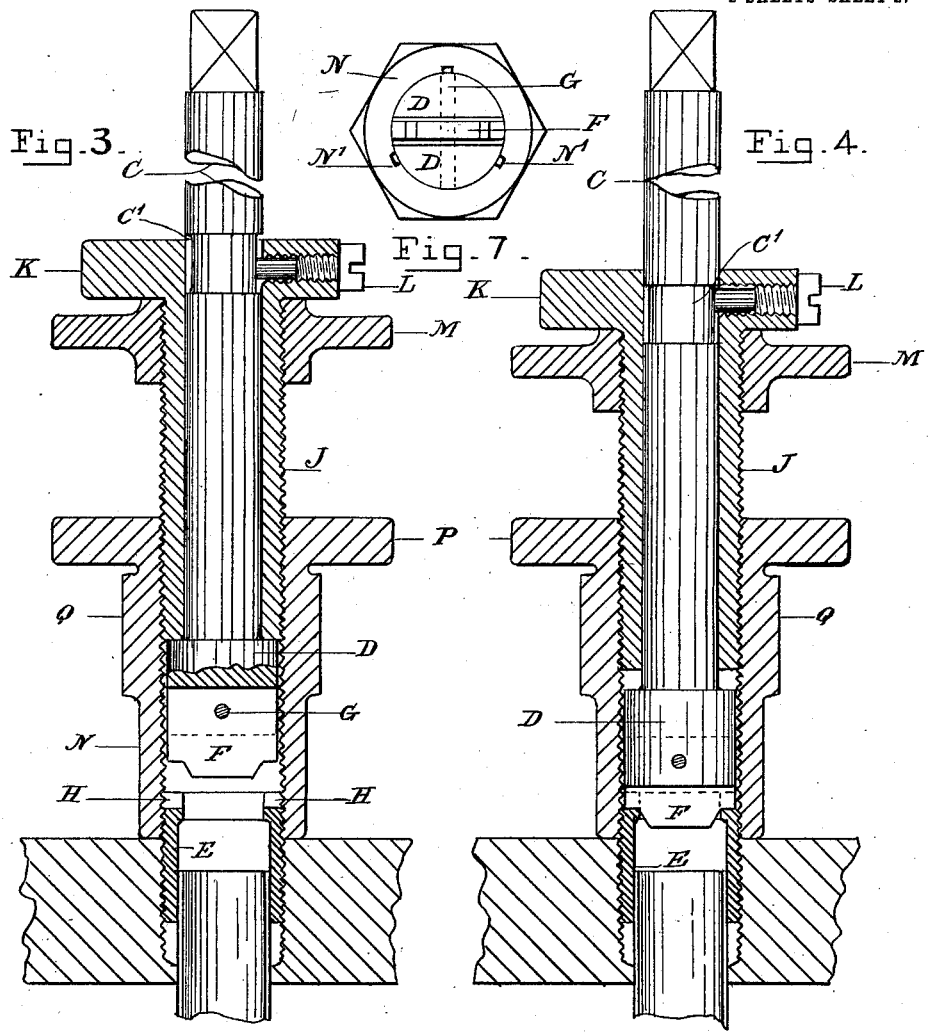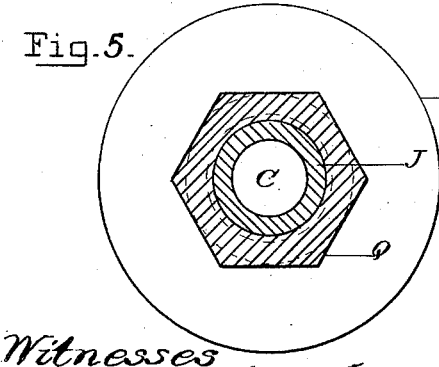

EDWARD COTTRELL JENKINS AND JOSEPH JENKINS, OF BIRKENHEAD, ENGLAND.

TOOL FOR INSERTING AND WITHDRAWING SCREWED FERRULES.

1,030,732.  Specification of Letters Patent.  Patented June 25, 1912.

Application filed December 15, 1911. Serial No. 665,941.

*To all whom it may concern:*

Be it known that we, EDWARD COTTRELL JENKINS and JOSEPH JENKINS, subjects of the King of Great Britain and Ireland, residing at Birkenhead, in the county of Chester, England, have invented Improvements in Tools for Inserting and Withdrawing Screwed Ferrules, of which the following is a specification.

This invention relates to tools of the kind described in the specification of prior Letters Patent granted to us, No. 1,009,248, for extracting screw threaded ferrules from tube plates. Such apparatus comprises a shank having at one end a removable turnscrew piece, and a rotary socket encircling the said end of the shank. As heretofore constructed and as shown in said patent the tool is suitable for extracting ferrules that project a predetermined distance beyond the tube plate, but if a ferrule projects to a less extent, the turnscrew piece cannot be pressed down to the full depth of the groove formed in the end of the ferrule. Now it is very important when extracting ferrules, especially ferrules that have become corroded in the tube plate, that the turn screw piece should extend right down to the bottom of the ferrule groove, and the improved tool according to this invention is so constructed that this can be done. The shank of the improved tool is capable of adjustment in an endwise direction so that, no matter how far or how little the ferrules extend above the tube plate the rotary socket can be screwed down onto the projecting end of the ferrule until its end comes into contact with the face of the tube plate. When this is done the shank with its turnscrew piece is forced into contact with the ferrule and firmly held in position until the ferrule is extracted. By the same means of adjustment ferrules can be inserted in the tube plate to any predetermined depth according to requirements.

Referring to the accompanying illustrative drawings Figure 1 is a sectional elevation of the improved tool as adjusted for inserting ferrules a predetermined desired depth into a tube plate. Fig. 2 is a similar view taken at right angles to Fig. 1 but showing a ferrule tightly gripped in the tool ready for being screwed into the tube plate. Figs. 3 and 4 are similar views to Fig. 1 but showing the parts of the tool in other positions as hereinafter referred to. Fig. 5 is an inverted cross section corresponding to the line A B of Fig. 1; Fig. 6 is a view of the upper end of the tool with parts removed, and Fig. 7 is a view of the lower end of the tool.

The turning spindle or shank C is squared at its outer end to receive a spanner or turning lever while its lower end is enlarged at D to practically the same diameter as the bottom of the thread of the ferrule E. To retain it in position the spindle C has a groove $C^1$ formed in as shown. The turnscrew piece or steel cross bar F is removably held by a pin G in the enlarged portion D. The lower end of the cross bar F projects beyond the end of the enlarged portion D and is shaped as clearly shown in Fig. 3 to form a guide for the outer edges to enter the groove H in the ferrule E.

By means of the adjustable tubular spindle J which is bored out to slide on the spindle C the cross bar F can be pressed down tightly in the ferrule groove H by the lower end of the said spindle pressing on the upper end of the enlarged portion D. The upper end of the tubular spindle J is enlarged to form a gripping flange K having a milled edge and is provided with a set screw L that enters the groove $C^1$ formed in the spindle C. The exterior of the tubular spindle J is of the same diameter as and is screwed to correspond with the ferrule the tool is intended to handle and is furnished with a back or lock nut M.

The rotary socket nut N is screw threaded throughout its entire length to the same diameter and pitch as the ferrule and has an enlarged or flanged end P with milled edges whereby it can readily be rotated for screwing it onto the ferrule as far as possible by hand. Below this flange the rotary socket is of hexagonal cross section at Q to receive a spanner for tightly screwing it onto a ferrule until the end of the steel cross bar rests on the bottom of the groove therein as shown in Fig. 2.

When in the operation of screwing a ferrule into a tube plate, the lock nut M is screwed tightly onto the end of the rotary socket the tubular spindle J is prevented from moving backwardly so that the upper end of the ferrule can only enter the socket the predetermined distance and when the spindle C is turned for inserting the ferrule in the tube plate the distance to which the ferrule can be inserted in the tube plate will be limited by the end of the rotary socket coming into contact with the tube plate. The ferrule is then released by unscrewing the rotary socket therefrom.

When the improved tool is employed for extracting ferrules whose projecting ends vary in length, the locking nut M is screwed back to its full extent see Fig. 4, and locked against the flange K. The rotary socket N, which is formed with grooves $N^1$ for clearing the threads of a corroded ferrule, is then screwed down onto the ferrule until stopped by the face of the tube plate see Fig. 3; the tubular spindle J is then turned to force the steel cross bar F hard down into the groove H in the ferrule, see Fig. 4, the lock nut M remaining screwed back home as shown. The shank or screw spindle C is then turned to withdraw the ferrule. It will thus be understood that the whole of the projecting end of the ferrule is encircled by the rotary socket Fig. 3, after which the spindle and steel cross bar are forced down by the tubular spindle J, Fig. 4, and cannot be forced back while being extracted. The recess in the shank spindle in which the set screw L engages is made wide enough to allow sufficient end play of the spindle to allow of the cross bar F being placed in the groove H of ferrule before being finally pressed down.

What we claim is:—

1. A tool for inserting and withdrawing screwed ferrules, comprising a shank, a cross bar mounted in one end of said shank and adapted to engage a screw driver notch formed in the end of a ferrule, an externally screwed spindle mounted to rotate on said shank, and an internally screw threaded socket arranged to screw on said screwed spindle and adapted to embrace the cross bar.

2. A tool for inserting and withdrawing screwed ferrules, comprising a shank, a cross bar mounted in one end of said shank and adapted to engage a screw driver notch formed in the end of a ferrule, an externally screwed spindle mounted to rotate and move endwise to a limited extent on said shank, and an internally screw threaded socket arranged to screw on said screwed spindle and adapted to embrace the cross bar.

3. A tool for inserting and withdrawing screwed ferrules, comprising a shank, a cross bar mounted in one end of said shank and adapted to engage a screw driver notch formed in the end of a ferrule, an externally screwed spindle mounted to rotate on said shank, an internally screw threaded socket arranged to screw on said screwed spindle and adapted to embrace the cross bar and a lock nut on said screwed spindle.

4. A tool for inserting and withdrawing screwed ferrules, comprising a shank, a cross bar mounted in one end of said shank and adapted to engage a screw driver notch formed in the end of a ferrule, an externally screwed spindle mounted to rotate on said shank, a milled head on said spindle, means for limiting endwise movement of said spindle relatively to said shank, and an internally screw threaded socket arranged to screw on said screwed spindle and adapted to embrace the cross bar.

5. A tool for inserting and withdrawing screwed ferrules, comprising a shank, a cross bar mounted in one end of said shank and adapted to engage a screw driver notch formed in the end of the ferrule, an externally screwed spindle mounted to rotate on said shank, a milled head on said spindle, means for limiting endwise movement of said spindle relatively to said shank, an internally screw threaded socket arranged to screw on said screwed spindle and adapted to embrace the cross bar, a milled head on said socket and a lock nut on said spindle adapted to bear on said socket.

Signed at 22 Water street, Liverpool, England, this first day of December 1911.

EDWARD COTTRELL JENKINS.
JOSEPH JENKINS.

Witnesses:
F. M. C. SCOTT,
H. WATSON.

Copies of this patent may be obtained for five cents each, by addressing the "Commissioner of Patents, Washington, D. C."